(12) United States Patent
Malavenda

(10) Patent No.: US 8,438,820 B1
(45) Date of Patent: May 14, 2013

(54) FLOWER HANDLING APPARATUS AND METHOD

(75) Inventor: George Malavenda, Key Biscayne, FL (US)

(73) Assignee: NF Global, Key Biscayne, FL (US)

(*) Notice: Subject to any disclaimer, the term of this patent is extended or adjusted under 35 U.S.C. 154(b) by 0 days.

(21) Appl. No.: 13/554,155

(22) Filed: Jul. 20, 2012

(51) Int. Cl.
*B65B 63/00* (2006.01)

(52) U.S. Cl.
USPC .............................................. 53/513; 53/435

(58) Field of Classification Search .................... 53/513, 53/585, 515, 435
See application file for complete search history.

(56) References Cited

U.S. PATENT DOCUMENTS

| | | | |
|---|---|---|---|
| 3,659,709 A | 5/1972 | Bartlett et al. | |
| 3,738,212 A | 6/1973 | Goodale | |
| 4,095,391 A * | 6/1978 | Anguiano | 53/515 |
| 4,601,156 A * | 7/1986 | Parry et al. | 53/399 |
| 4,831,925 A | 5/1989 | Zanetti | |
| 5,157,899 A | 10/1992 | Tas | |
| 5,586,425 A | 12/1996 | Craig et al. | |
| 6,050,412 A | 4/2000 | Clough et al. | |
| 6,189,295 B1 * | 2/2001 | Craig et al. | 53/449 |
| 6,351,910 B1 | 3/2002 | Myrland | |
| 6,672,002 B1 | 1/2004 | Gumpper | |
| 6,931,818 B2 * | 8/2005 | van der Laan | 53/399 |

FOREIGN PATENT DOCUMENTS

| | | |
|---|---|---|
| EP | 1120028 | 8/2001 |
| JP | 09207907 | 8/1997 |
| JP | 11029115 | 2/1999 |
| WO | 03/004359 | 1/2003 |

* cited by examiner

*Primary Examiner* — Sameh H. Tawfik
(74) *Attorney, Agent, or Firm* — Dowell & Dowell, P.C.; Jorie L. Stroup

(57) ABSTRACT

A flower handling system includes loading, cutting, finishing, and boxing stations. Flowers are unloaded from dry-packed boxes at the cutting stations. Each cutting station includes a positioning arm that secures flower bundles and transports them from a first location adjacent a loading table to a second location above a conveyor. A bucket separating device deposits buckets one at a time onto the conveyor, and the buckets are filled with conditioning fluid. A cutting blade is positioned to cut flower stems as the positioning arm moves from the first to the second location. A clamping arm closes around the flowers and lifts them out of the positioning arm before lowering them into a fluid-filled bucket on the conveyor. The flower filled bucket is then transported through the finishing station to a boxing station where the bucket is deposited into a box for shipping to a wholesaler or retailer.

13 Claims, 13 Drawing Sheets

FLOWER HANDLING APPARATUS AND METHOD

BACKGROUND OF THE INVENTION

1. Field of the Invention

The present invention pertains to the art of flower handling, and more particularly, to a flower trimming and packing system for floral bouquets.

2. Discussion of the Prior Art

The process of mass producing floral bouquets for sale at a supermarket or the like can be an expensive and labor intensive process. In general, bouquet components must first be sorted, grouped according to desired characteristics, arranged in a desired bouquet configuration, packaged, and shipped to a desired location. Often, flowers are initially sorted and bundled at a location remote from a bouquet distributing center, which prepares and transports the flowers to retailers or wholesalers. Methods have been developed for automating the sorting and bundling of flowers. For example, U.S. Pat. No. 5,157,899 depicts a method and apparatus for sorting and bundling flowers, which sorts flowers individually, bundles the flowers, cuts the stems of the flowers, and moves the bundles via a conveyor. Another system and method set forth in U.S. patent application Ser. No. 13/457,629 allows a user to arrange floral elements in a desired array to produce twisted floral bouquets in large quantities, which may then be shipped to a retailer or distribution center. However, such methods are concerned with the initial grouping of flowers, and do not address downstream processing of floral bundles or bouquets.

It is well established that cut flowers can become dehydrated between the time they are cut and the time they are delivered to a wholesaler or retailer for sale. Wholesalers and retailers may attempt to counter this shipping related dehydration by re-cutting the stressed flowers upon arrival to remove part of the stem so that the stem can resume drawing water. However, floral bundles or bouquets may be heavily stressed by the time a retailer gets the bundles or bouquets. Further, manually cutting the bundles or bouquets can be a labor intensive process that introduces further damage to the floral elements. Therefore, there is seen to be a need in the art for a flower handling system and method that allows large quantities of floral bundles or bouquets to be kept fresh through delivery to a wholesaler or retailer.

SUMMARY OF THE INVENTION

The present invention is directed to a flower handling system comprising a loading station for opening dry-packed flowers and distributing the flowers to one or more cutting stations, a finishing station wherein workers take steps to finish the flowers, and a boxing station where the fluid-filled buckets of flowers are packed into boxes for shipping. The cutting station includes a positioning arm in communication with a controller. A carrier portion of the positioning arm includes at least one side wall defining an opening for receiving flower bundles therein, and a base portion mounting the positioning arm to a frame such that the positioning arm is configured to transport flower bundles between a first location and a second location during a processing cycle. The base portion includes a pivoting connector enabling the carrier portion to rotate from a first position wherein an axis extending through the opening extends in a first direction, to a second position wherein the axis extends at an angle with respect to the first direction. A cutting apparatus including a cutting blade is positioned to cut the stems of the flower bundles held by the positioning arm as the positioning arm moves from the first location to the second location. Additionally, a clamping arm is located above an end station on the first bucket conveyor, and includes first and second clamping portions adapted to move from an open position to a closed position.

Further, a fluid supplying outlet positioned above the first bucket conveyor is configured to dispense fluid into a bucket positioned on the bucket conveyor. In a preferred embodiment, the cutting station further includes a bucket separating device including a destacking unit extending between side walls of a bucket support, wherein, each of the side arms includes a support ledge and a wedge. A control unit is configured to move the destacking unit between a first position wherein a rim of a bottom bucket is supported on the support ledges, and a second position wherein the wedges extend between the rim of the bottom bucket and a rim of a second bucket nested within the bottom bucket such that the rim of the bottom bucket is no longer supported on the top walls of the respective support ledges and the bottom bucket drops by gravity onto the first conveyor.

In use, a worker inserts the stems of a plurality of flower bundles into the opening of the positioning arm at the first location, and actuates a switch to begin an automated processing cycle. In one example, one dozen flower bouquets each including one dozen flowers are inserted into the positioning arm. A plate moveable within the opening of the carrier portion extends to engage and secure the flower bundles within the positioning arm. The controller then causes the positioning arm to rotate about the pivoting connector from the first position wherein the flower bundles are substantially horizontally aligned, to the second position wherein the flower bundles are substantially upright. The positioning arm is then transported between the first location and the second location such that the stems of the plurality of flower bundles are transported past, and are severed by, the cutting apparatus. A debris carrying conveyor located beneath the cutting apparatus catches cut stems and other debris falling from the cutting apparatus and deposits the debris into a debris bin. A bar extending from the positioning arm contacts a flower filled bucket located at the end station as the positioning arm moves from the first location to the second location, and pushes the flower filled bucket onto a second bucket conveyor, which then carries the flower filled bucket toward the finishing station.

When the positioning arm reaches the second location, the clamping portions of the clamping arm are closed about the plurality of flower bundles. The plate of the positioning arm retracts, thereby releasing the flower bundles and allowing the clamping arm to rise up and withdraw the flower bundles from the positioning arm. The positioning arm is then returned to the first location. A bucket on the first conveyor is filled with conditioned water and is advanced into the end station below the clamping arm. The clamping arm is then lowered, and the flower bundles are released into the fluid-filled bucket. At this point in the process, the positioning arm is back at its first location, the clamping arm is in its original or first position, and the system is ready for another processing cycle to begin. The flower filled bucket is then transported through the finishing station to the boxing station, where it is wet-packed for shipping to a wholesaler or retailer. Thus, the present system allows for the automated cutting and loading of a plurality of finished and ready-for sale flower bouquets into fluid-filled buckets for shipping to retailers or wholesalers. Once at the retailers, each bucket can simply be unpacked and set out in a display area, where a purchaser can select a pre-wrapped flower bouquet from the plurality of flower bouquets within the bucket. Advantageously, no further processing is necessary at the retailer or wholesaler location.

Additional objects, features and advantages of the present invention will become more readily apparent from the following detailed description of preferred embodiments when taken in conjunction with the drawings wherein like reference numerals refer to corresponding parts in the several views.

BRIEF DESCRIPTION OF THE DRAWINGS

The preferred embodiments of the invention will be described by way of example, and with reference to the accompanying drawings.

DETAILED DESCRIPTION OF THE PREFERRED EMBODIMENTS

Figure 1:
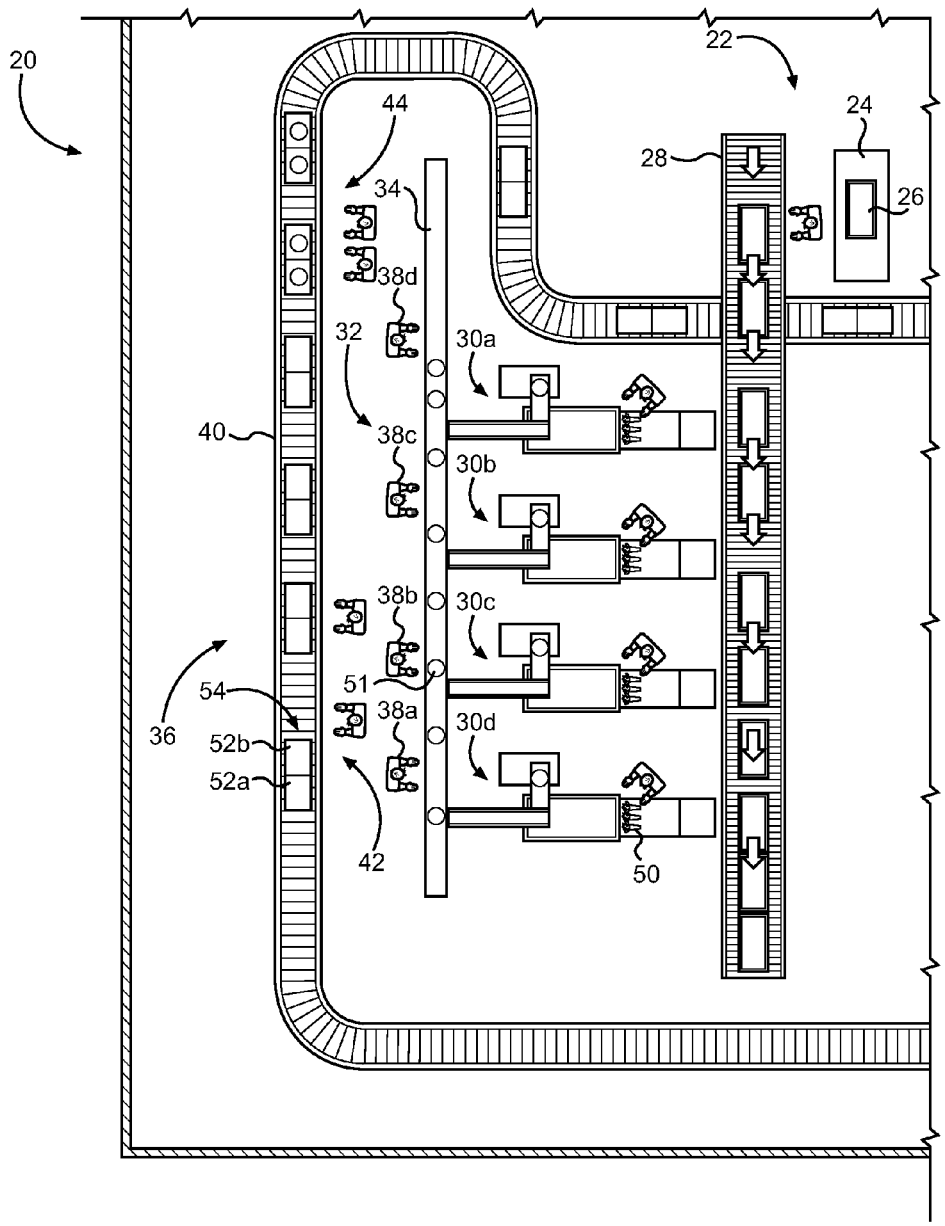
FIG. 1 is a plan view of a flower handling system of the present invention.

With initial reference to FIG. 1, a flower handling system of the present invention is generally indicated at 20. System 20 is configured to process pre-bundled or packaged floral elements or floral element bouquets. The term floral element or bundles as utilized herein is meant to encompass common vegetative bouquet elements such as flowers and greenery. However, all floral elements will simply be referred to as flowers hereafter for the sake of simplicity. Flower handling system 20 includes a flower unloading station 22 including a table 24 or other horizontal surface for opening boxes 26 of flower bundles, and a box transporting conveyor 28 for transporting boxes 26 from table 24 to one or more cutting stations 30a-30d. A flower finishing station is generally indicated at 32, which includes a bucket conveyor 34 for transporting buckets of flowers from cutting stations 30a-30d to a packing station generally indicated at 36. A plurality of flower finishing stations 38a-38d are set up along bucket conveyor 34. Packing station 36 includes a box transporting conveyor 40 that extends from a box-supplying area indicated at 42, to a box loading station 44.

In operation, workers at flower unloading station 22 cut open boxes 26 of pre-bundled flowers 50. Each pre-bundled flower is preferably pre-packaged in plastic or paper bouquet wrapping. The opened boxes 26 are then moved onto conveyor 28 for transport to one of the plurality of cutting stations 30a-30d. Workers at cutting stations 30a-30d unpack dry-packed flower bundles 50 from boxes 26 for processing through cutting stations 30a-30d. Empty boxes 26 may then be conveyed to a bailer to be compacted, thereby optimizing space on the processing floor. At each cutting station 30a-30d, a plurality of flower bundles 50 are cut and put in buckets 51, which are transported to bucket conveyor 34. Workers at finishing stations 38a-38d remove shipping netting from flower heads or perform other tasks for finishing flowers or other floral elements in flower bundles 50. Meanwhile, wet-shipping containers or boxes 54 including plastic bags 52a and 52b located therein are transported by conveyor 40 from box-supply area 42 to box loading station 44. In the embodiment shown, two plastic bags 52a and 52b are inserted side by side within a box 54 that is sized to receive two buckets 51. Plastic bags 52a and 52b can be inserted into boxes 54 at box supply area 42, or may be provided at box supply area 42 already prepared with plastic bags 52a and 52b therein.

Finished buckets of flowers 51 are transferred from bucket conveyor 34 to a box 54 at the box loading station 44. In the embodiment shown, a bucket 51 of finished flowers is inserted into each of bags 52a and 52b in a box 54, such that each bucket of flowers is contained within its own plastic bag within box 54. Boxes 54 can then be transported for further processing. For example, in a preferred system, boxes 54 are further transported through a box labeling machine and a box closing and taping machine (not shown). Boxes 54 are then loaded onto a palletizer and shrink wrapped before being loaded into vehicles for transport to a desired destination.

It should be appreciated that the number and position of stations within system 20 may vary. For example, system 20 could be configured with more or less cutting stations 30a-30d and finishing stations 38a-38d. Advantageously, system 20 allows for the timely mass processing of dozens of pre-packaged flower bouquets, including the cutting of stems and immediate wet packing of the flowers in buckets of conditioned water. Details regarding the cutting of the flowers will now be discussed with reference to FIGS. 2-6.

Figure 2:
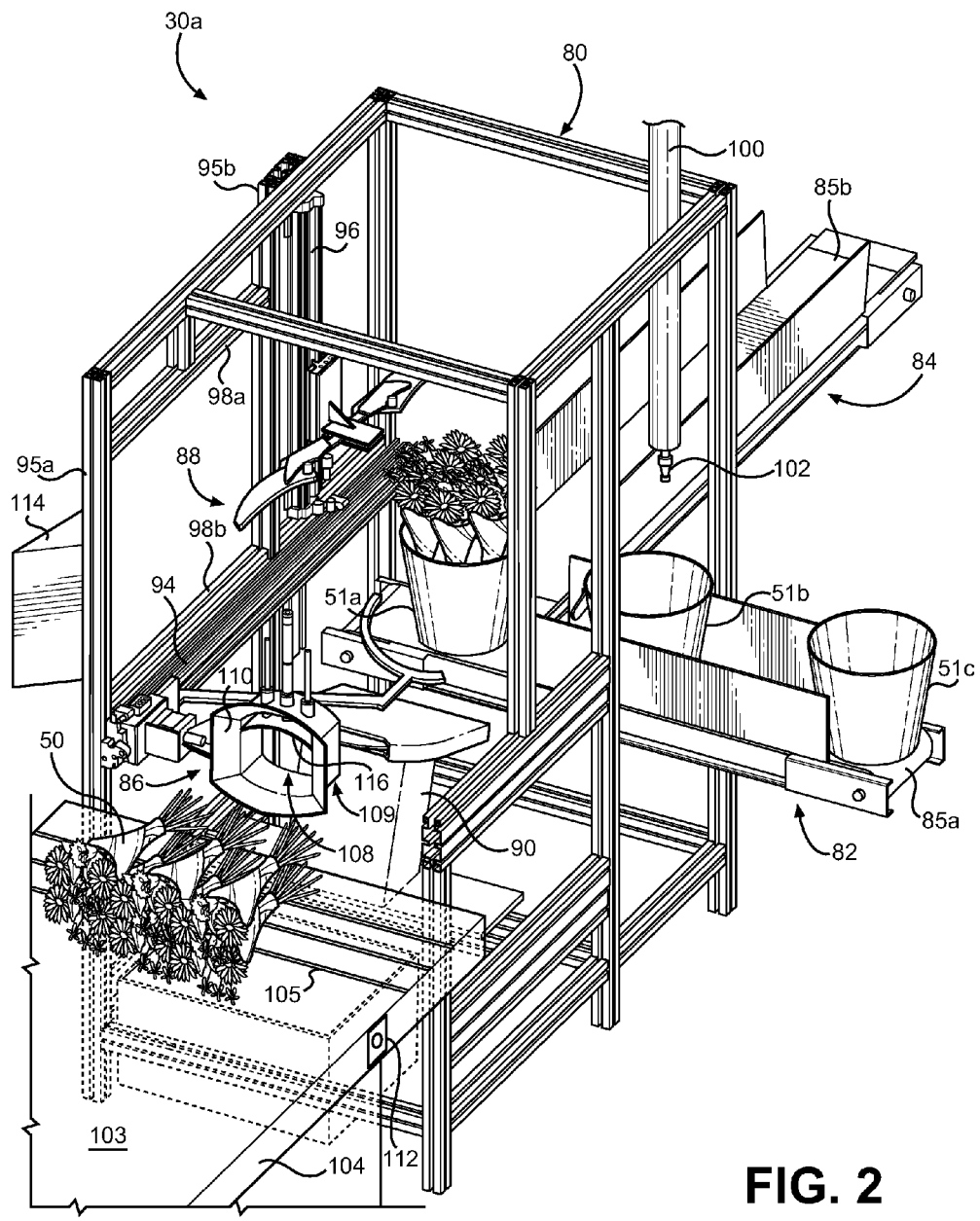
FIG. 2 is a perspective view of a cutting station of the present invention.

As all cutting stations 30a-30d are substantially identically constructed, only the details of cutting stations 30a-30d will now be discussed with reference to cutting station 30a in FIG. 2. In general, cutting station 30a includes a frame 80, a first bucket conveyor 82, a second bucket conveyor 84, a flower positioning arm 86, a clamping arm 88 and a cutter 90. First and second bucket conveyors 82 and 84 are preferably belt type conveyors, which include continuously moving respective belts 85a and 85b. Frame 80 can take on any configuration necessary to support the various elements of cutting station 30a. In the embodiment shown, positioning arm 86 is moveably mounted on a horizontal track 94 supported by vertical posts 95a and 95b. Similarly, clamping arm 88 is moveably mounted to a vertical track 96, which is supported by horizontal posts 98a and 98b. Additionally, cutting station 30a includes a fluid supply system indicated at 100, having an outlet nozzle 102 for directing conditioned water into a plurality of buckets 51a-51c.

The manner in which cutting station 30a is operated through one complete processing cycle will now be discussed with reference to FIGS. 2-6. In use, a worker places a plurality of pre-bundled flowers 50 on the upper support surface 103 of a table 104. Table 104 can be free-standing or can be supported by frame 80. Table 104 is sized to receive flower bundles 50 having a number of different lengths. In a preferred embodiment, a plurality of different colored strips or other indicia 105 indicate the desired position for the bundles of flowers 50, depending on the desired final length of the flowers. Once a desired number of flower bundles 50 have been stacked, a worker gathers all of the bundles of flowers 50 and inserts the stems of the flowers into an opening 108 of a carrier portion 109 of positioning arm 86 defined by interconnected side walls 110. Side walls 110 are preferably sized to receive the stems from at least one dozen bundles of flowers 50. The flower bundles 50 are preferably in the form of a bouquet including one dozen or one half dozen flowers. Once the flowers are positioned within opening 108, a worker actuates a switch 112 to start an automated processing cycle controlled via at least one controller indicated at 114. For the sake of simplicity, control lines connecting controller 114 to various elements of cutting station 30a, including switch 112, are not depicted in FIGS. 2-6. Preferably, the one or more controllers 114 are in the form of a Programmable Logic Controller (PLC). Although depicted as located on table 104, it should be appreciated that switch 112 can be located anywhere convenient to a worker operating cutting station 30a.

Figure 3:
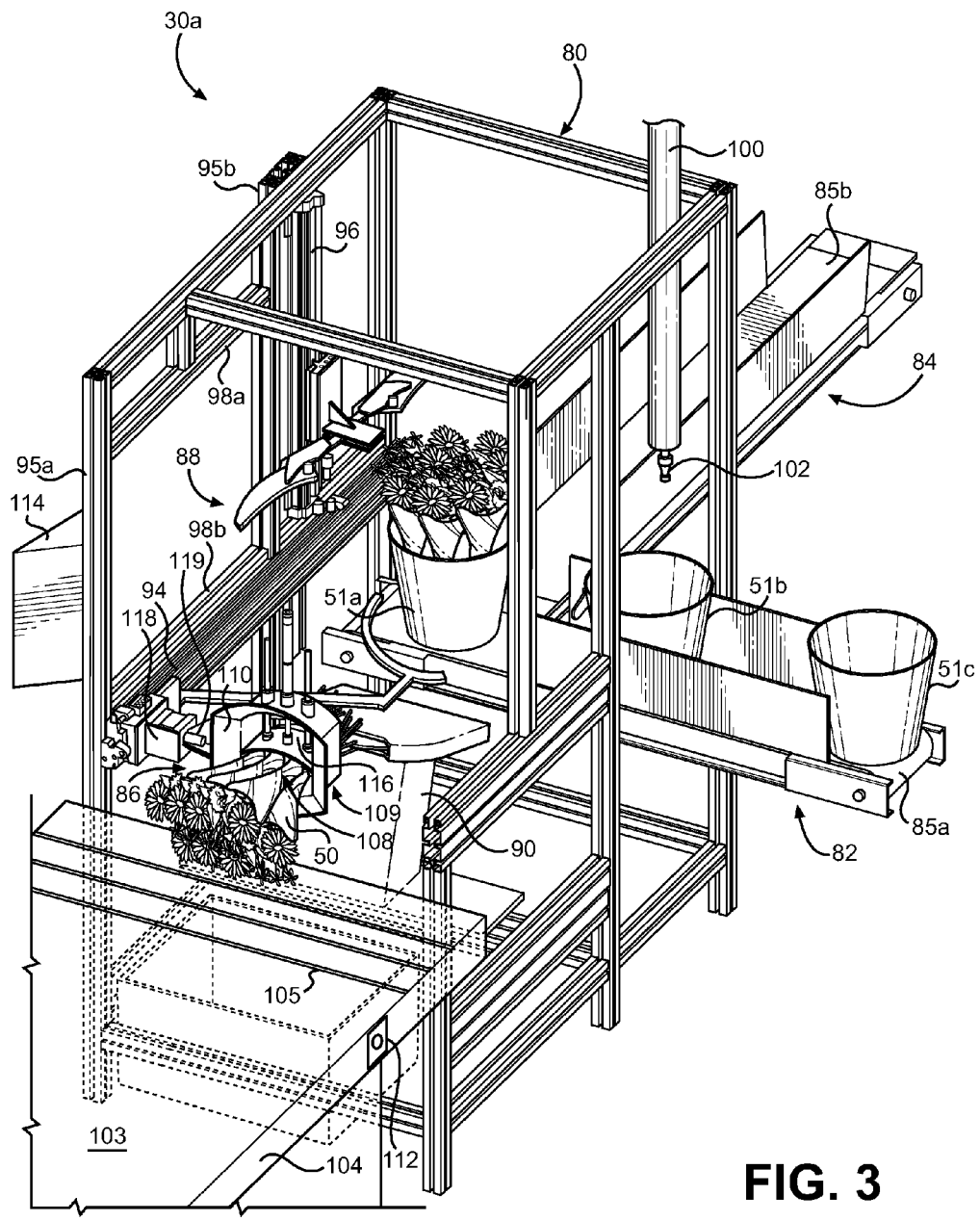
FIG. 3 depicts a positioning arm of the cutting station of FIG. 2 in a first position.
Figure 4:
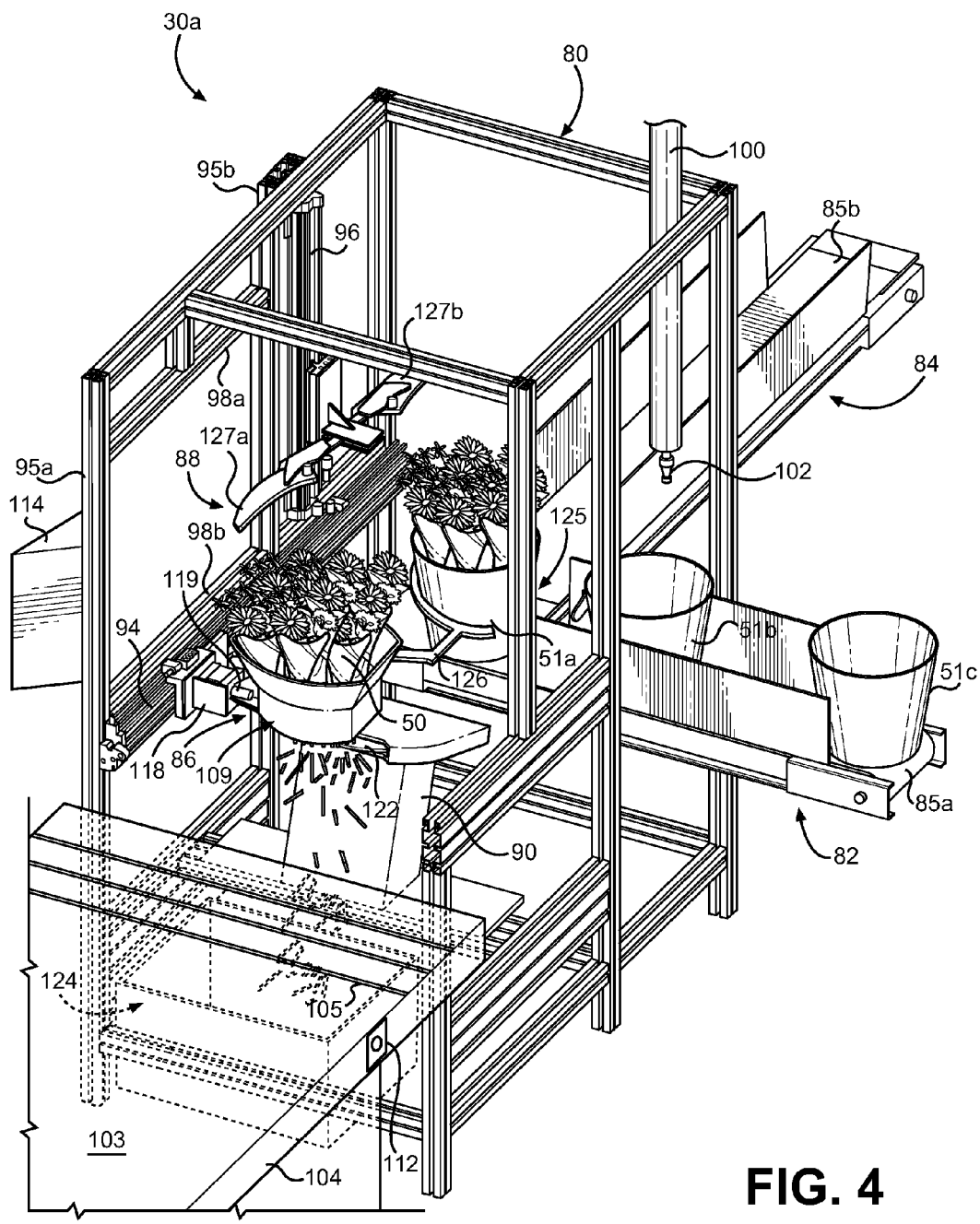
FIG. 4 depicts a positioning arm of the cutting station of FIG. 2 at a second position.
Figure 5:
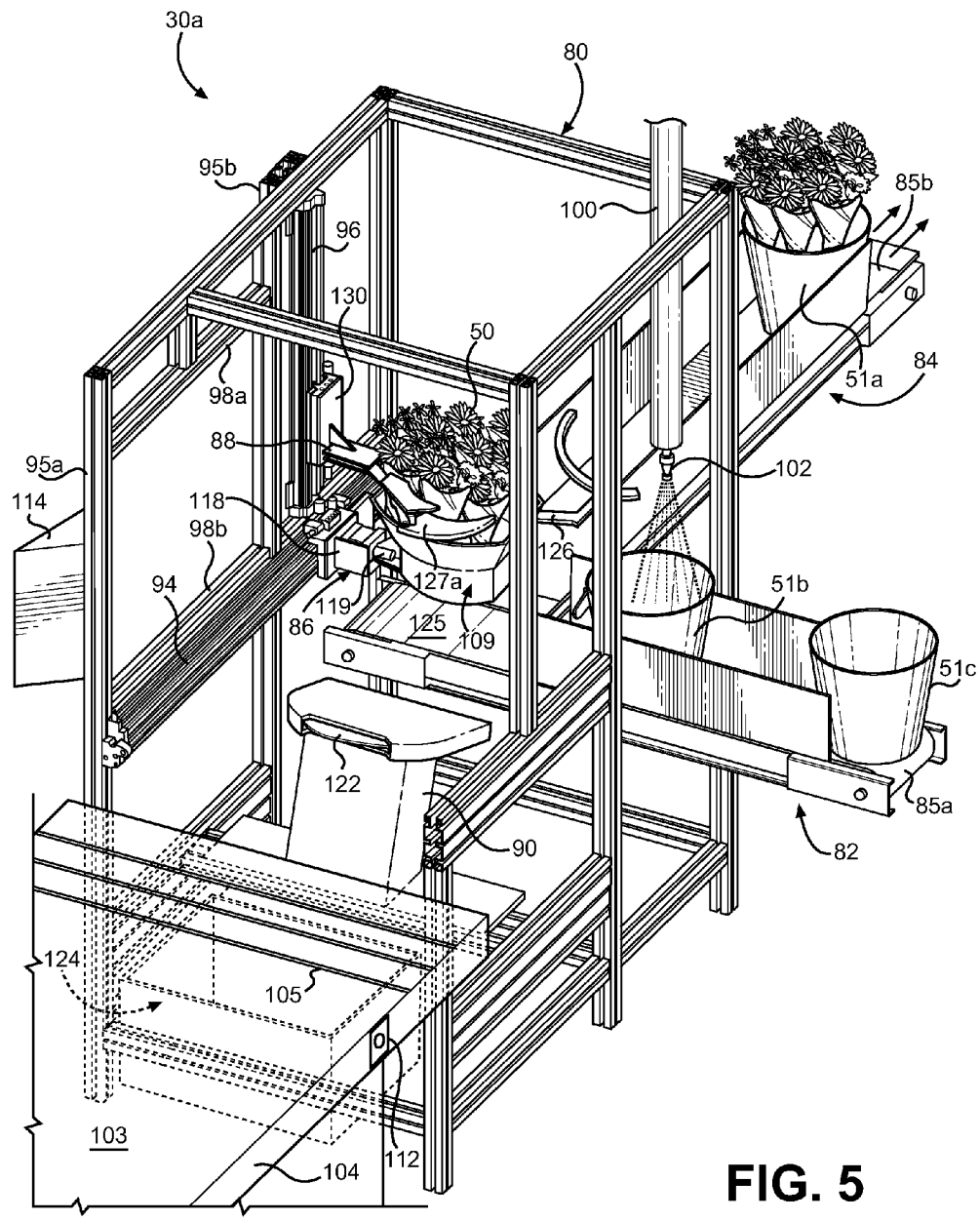
FIG. 5 depicts a clamping arm of the cutting station of FIG. 2 lifting flowers from the positioning arm.

With reference to FIG. 3, once switch 112 is actuated, a plate 116 positioned along one of side walls 110 within opening 108 is moved from a first position adjacent one of side walls 110, as depicted in FIG. 1, to a second, clamping position wherein a contact surface of plate 116 is pressed against a top surface of the plurality of flower bundles 50 located within opening 108, in order to secure flower bundles 50 within positioning arm 86. Positioning arm 86 is connected to a base portion 118 via a pivoting connector 119. Once plate 116 has secured a plurality of flower bundles 50 within opening 108, controller 114 causes positioning arm 86 to rotate about pivoting connector 119 such that an axis extending through opening 108 is moved from a substantially horizontal position to a substantially vertical position. In other words, flowers held within opening 108 are pivoted from a substantially horizontal position shown in FIG. 3, to an upright, substantially vertical position shown in FIG. 4. Next, base portion 118 is caused to move along horizontal track 94 from a first location on a first side of cutter 90, to a second location on the opposing side of cutter 90, as depicted in FIGS. 4 and 5. As positioning arm 86 carries flower bundles 50 past cutter 90, stems of flower bundles 50 are cut as they contact a rotating circular blade 122, as depicted in FIG. 4. A debris collector 124 is located below blade 122 to collect severed stems or other floral debris falling from flower bundles 50. In the first embodiment shown, debris collector 124 is in the form of a bin or the like.

As depicted in FIG. 4, a bucket of flowers 51a prepared in a previous processing cycle is located at an end station 125 of first bucket conveyor 82. As previously noted, first bucket conveyor 82 is preferably a continuously moving belt conveyor, such that bucket 51a positioned within end station 125 abuts a stop (not shown) to hold the bucket in place as belt 85a of conveyor 82 continuously slides beneath the bucket 51a. As positioning arm 86 moves past blade 122, a bucket engaging portion of a bucket contacting bar 126 extending from base portion 118 contacts bucket 51a and pushes bucket 51a off of belt 85a and onto belt 85b of second bucket conveyor 84. FIG. 5 depicts bucket 51a being conveyed away from end station 125 on belt 85b by the continuously moving second bucket conveyor 84. Once positioning arm 86 reaches a predetermined location above end station 125, first and second clamping portions 127a and 127b of clamping arm 88 are actuated by controller 114 to move from an initial resting or open position shown in FIG. 4, to a closed position wherein flower bundles 50 extending upward from positioning arm 86 are gripped between first and second clamping portions 127a and 127b, as shown in FIG. 5.

Figure 6:
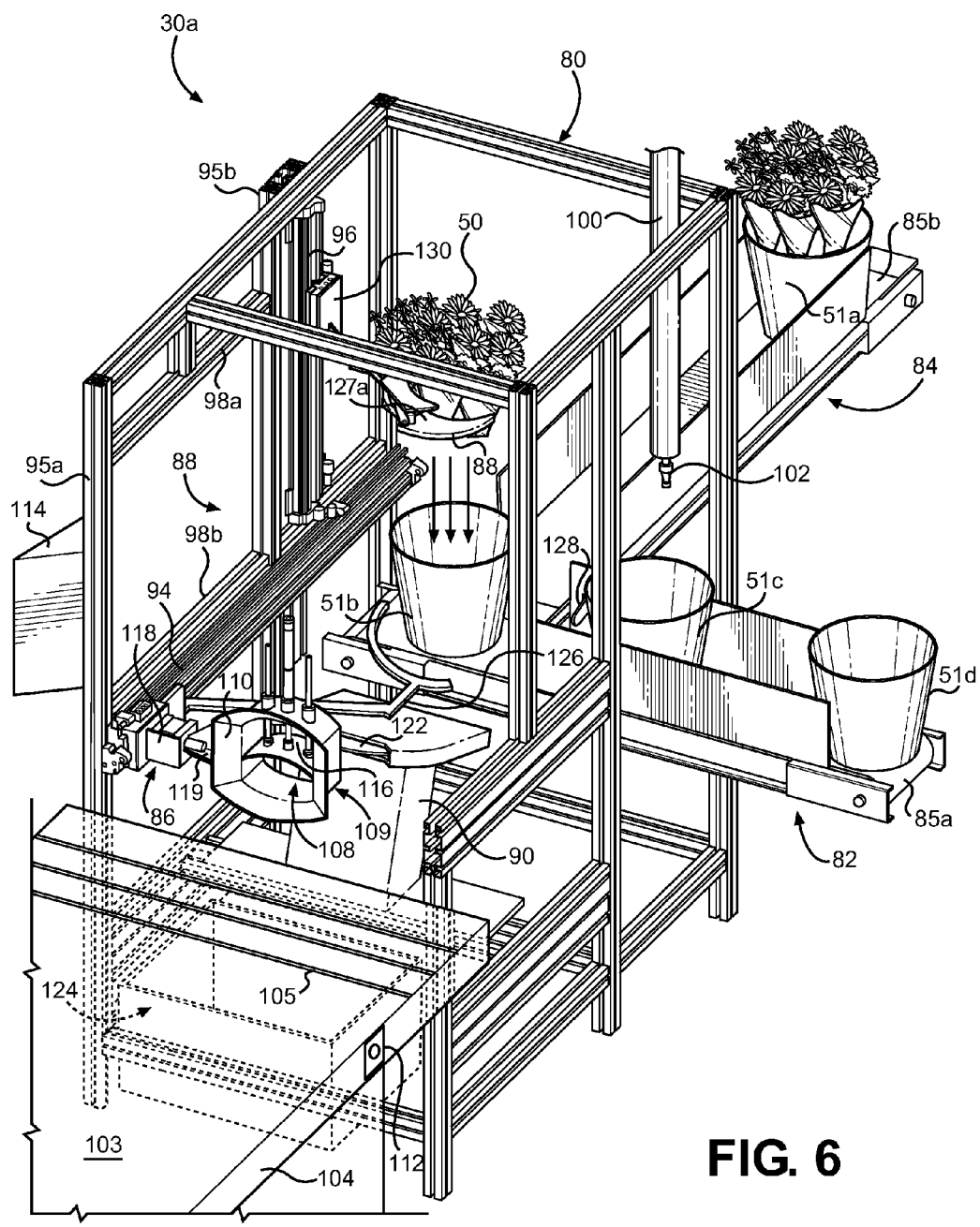
FIG. 6 depicts the clamping arm of FIG. 2 lowering flowers into a bucket.

As best seen in FIGS. 5 and 6, clamping arm 88 is movably supported on vertical track 96 by the connection of a base portion 130 to vertical track 96. Once flower bundles 50 are secured between first and second clamping portions 127a and 127b, controller 114 causes plate 116 to retract, releasing flower bundles 50. Next, controller 114 causes clamping arm 88 to move upward along vertical track 96 such that flower bundles 50 are completely removed from positioning arm 86.

At some point in the processing cycle prior to the position arm 86 moving vertically along track 96, controller 114 causes a predetermined amount of fluid to discharge into an empty bucket 51b positioned below outlet nozzle 102. Preferably, the fluid comprises water having a desired amount of floral preservatives. It should be understood that a pump and fluid supply (not shown) cooperate to supply the fluid to nozzle 102. The details of the fluid supply system are not considered part of the invention and will not be discussed in detail. In general, any number of known fluid supply systems could be utilized with the present invention. Once positioning arm 86 is moved vertically, controller 114 causes a stopper arm 128 extending across a portion of belt 85a to retract, thereby allowing a fluid filled bucket 51b to be carried by the continuously moving belt 51b into position at end station 125. Stopper arm 128 is immediately extended once bucket 51b is released in order to stop the next bucket 51c below outlet nozzle 102.

With reference to FIG. 6, once clamping arm 88 has reached a predetermined position on vertical track 96, controller 114 causes positioning arm 86 to return to its first position at its initial or starting location. Meanwhile, controller 114 causes clamping arm 88 to lower the flower bundles 50 held therein into fluid-filled bucket 51b. Next, the first and second clamping portions 127a and 127b open to release the flower bundles 50, and return clamping arm 88 to an initial resting position. At this point it should be understood that a full processing cycle has been completed, and elements of cutting station 30a have returned to their initial or starting position, which is depicted in FIG. 2.

Figure 7:
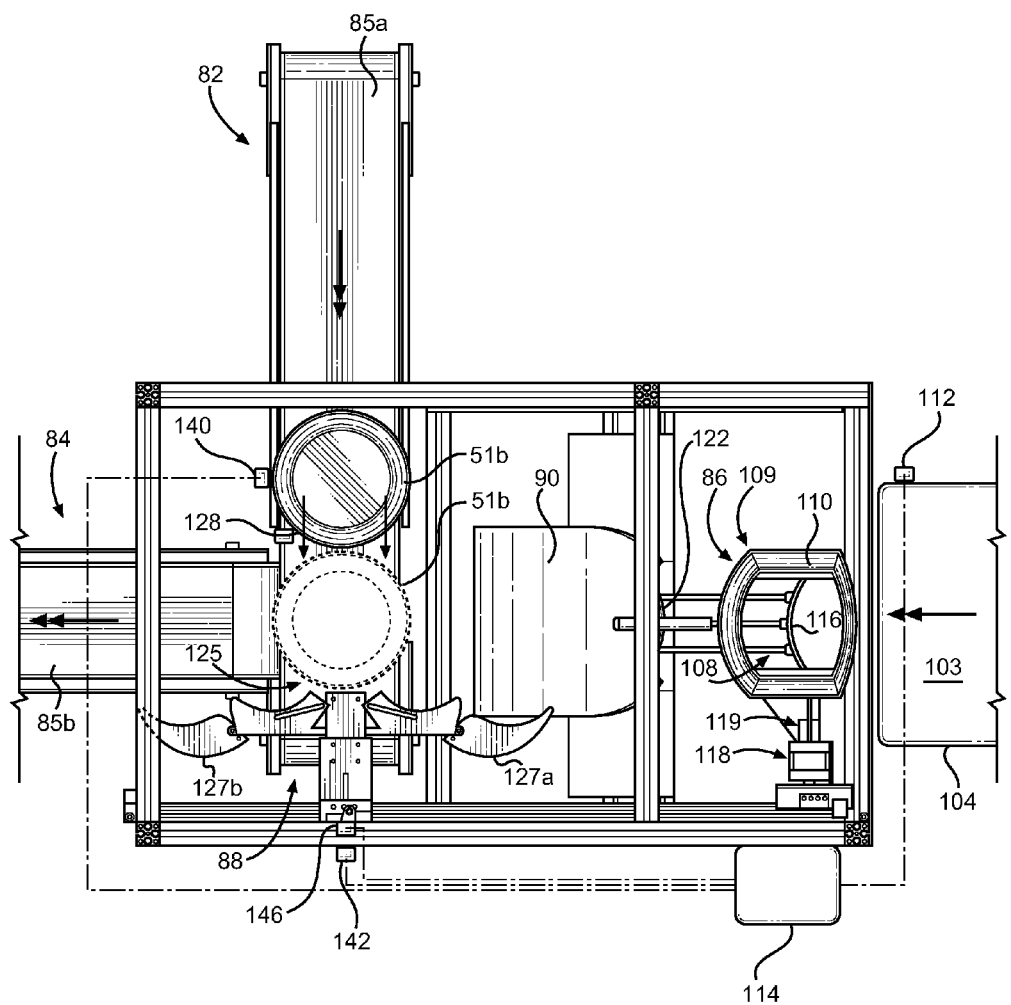
FIG. 7 depicts a sensor system for use with the cutting station of the present invention.

Preferably, the position of the various elements of cutting station 30 are sensed by a combination of sensors, which communicate with controller 114. Sensors for use with the present invention include light, pressure or other types of known sensors. One example of such a sensing system is set forth in FIG. 7. In use, once a worker has inserted a plurality of flower bundles 50 into positioning arm 86, the worker then actuates switch 112. A pressure sensor 140 connected to stopper arm 128 senses when a fluid-filled bucket, such as bucket 51b, is in a holding station below nozzle 102 and communicates the same to controller 114. If a fluid-filled bucket 51b is present, controller 114 starts a processing cycle by extending plate 116 and rotating positioning arm 86 approximately 90 degrees. Positioning arm 86 is then moved horizontally past cutter 90 to a position above end station 125. A photoelectric sensor 142 senses the position of positioning arm 86 above end station 125 and actuates clamping arm 88 to close about the flower bundles 50 within positioning arm 86. Once photoelectric sensor 142 senses that clamping arm 88 is in a closed position, controller 114 retracts plate 116 to release flower bundles 50 within positioning arm 86. Thereafter, controller 114 causes clamping arm 88 to rise to a second vertical position. When a pressure sensor 146 detects that clamping arm 88 is in the second vertical position, controller 114 causes stopper arm 128 to retract, thereby allowing fluid filled bucket 51b to advance into end station 125. Controller 114 also causes positioning arm 86 to return to its home location, then rotate 90 degrees to return to its starting position. Controller 114 then causes clamping arm 88 to lower the flower bundles 50 into fluid filled bucket 51*b*, and release the flower bundles 50, thereby returning clamping arm 88 to its home or start position.

Figure 8:
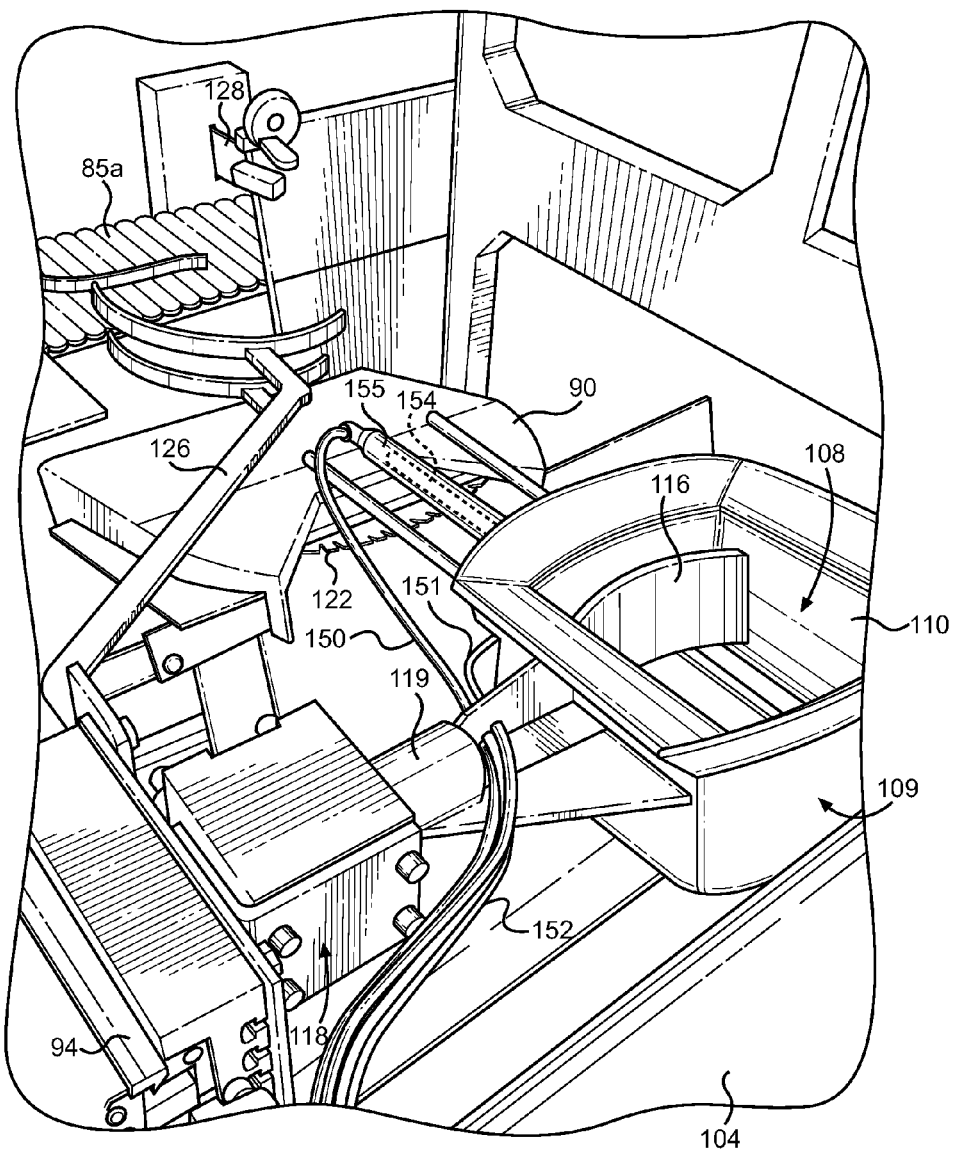
FIG. 8 depicts a more detailed view of the positioning arm of the present invention.

The various elements of cutting station 30*a* may be operated pneumatically, electronically, or by any combination of standard operating mechanisms. In the preferred embodiment, cutter 90 is run continuously, and powered by a dedicated electric motor (not shown). Similarly, first and second conveyors 82 and 84 are powered by one or more electric motors (not shown). Various other elements of cutting station 30*a* are preferably pneumatically operated via the at least one controller 114. More specifically, controller 114 controls a set of pressurized valves, based in part on feedback from a number of sensors, such as sensors 140, 142 and 146, which enable selective actuation of pistons to move the various elements of cutting station 30*a*. FIG. 8 shows a more detailed view of positioning arm 86, including pneumatic lines 150-152, which actuate respective pistons to control the rotation of positioning arm 86 about pivoting connector 119, control the movement of base portion 118 along horizontal track 94, and move plate 116 from a first position to a second, clamping position. For example, a piston 154 housed within a piston housing 155 is extended when pressurized air is sent through line 150 by controller 114, thereby extending plate 116 to secure flower bundles 50 within opening 108. The use of pneumatic systems to actuate pistons is generally known, and therefore, additional details of the pneumatic operators will not be discussed herein.

Figure 9:
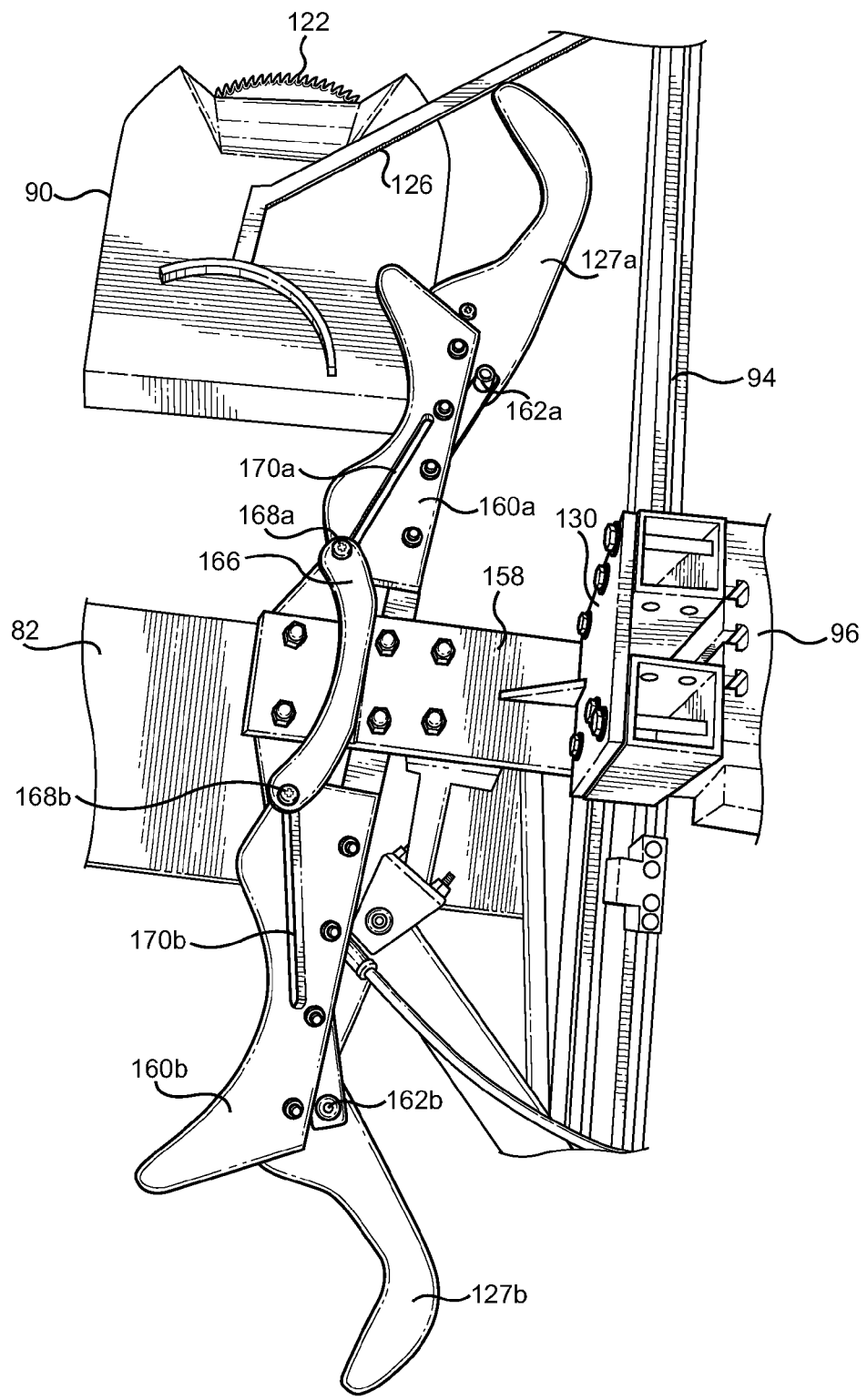
FIG. 9 depicts a more detailed view of the clamping arm of the present invention.

With respect to clamping arm 88, it should be understood that any number of known mechanical arm configurations may be adapted for use with the present invention. However, one clamping arm 88 is depicted in more detail in FIG. 9. First and second clamping portions 127*a* and 127*b* are connected to a central carrier 158 via respective wings 160*a*, 160*b*. More specifically, first and second clamping portions 127*a* and 127*b* are connected via respective hinges 162*a* and 162*b* to wings 160*a* and 160*b*. In turn, wings 160*a* and 160*b* are connected to central carrier 158 via pivoting connectors 164*a* and 164*b*. A curved pivot bar 166 is slidably connected to respective wings 160*a* and 160*b* through pins 168*a*, 168*b* housed within respective slots 170*a*, 170*b*. In use, controller 114 actuates a series of pistons (not shown) to open and close clamping arm 88 about flower bundles 50. More specifically, clamping portions 127*a* and 127*b* pivot about respective hinges 162*a* and 162*b* while wings 160*a* and 160*b* pivot about respective pivoting connectors 164*a* and 164*b* to swing clamping portions 127*a* and 127*b* inwardly towards one another. As clamping portions 127*a* and 127*b* swing together, pins 168*a* and 168*b* travel within respective slots 170*a* and 170*b* from a first position shown, to a second distal position.

Figure 10:
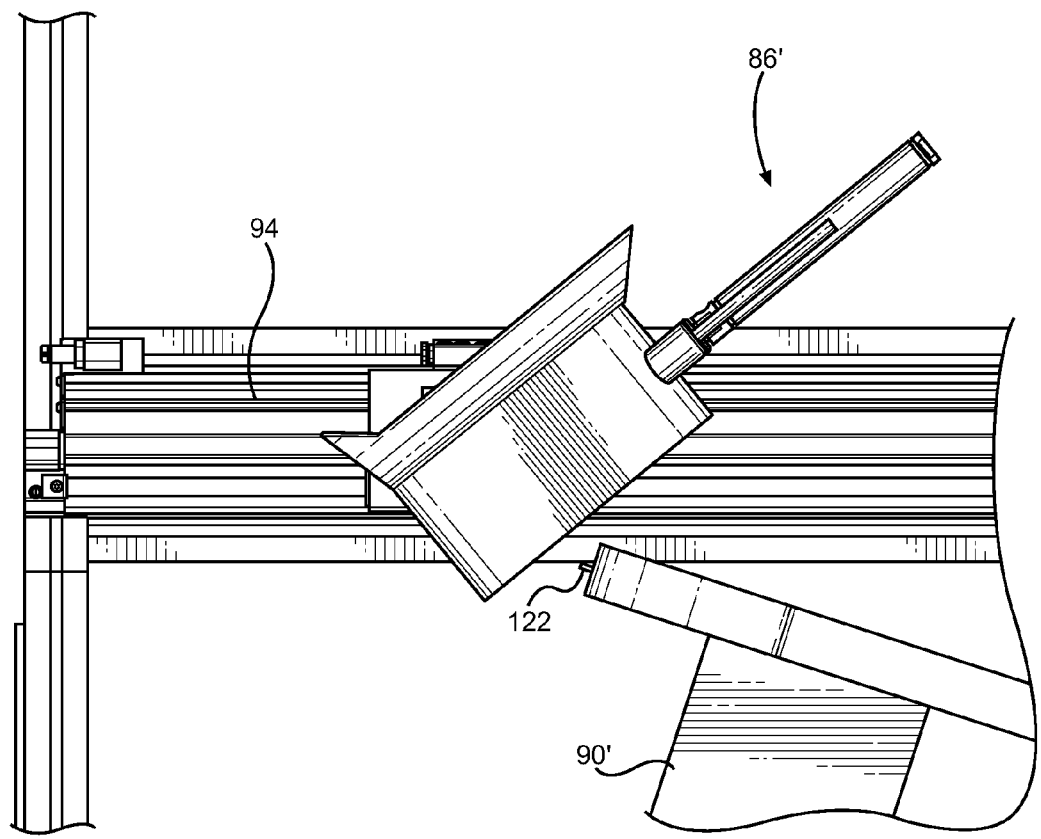
FIG. 10 is a partial side view of an alternative positioning arm arrangement of the present invention.

Although depicted as including generally horizontal and vertical tracks 94 and 96, it should be appreciated that sloped or angled configurations could also be utilized, depending on the desired configuration of frame 80 and the space available for cutting station 30*a*. Other alterations can be made to the configuration of cutting station 30*a* without departing from the spirit of the invention. For example, in an alternative embodiment depicted in FIG. 10, an alternative cutter 90' is configured to hold cutting blade 122 at an angle with respect to horizontal, and positioning arm 86' is controlled by the at least one controller 114 such that the positioning arm 86' rotates from an initial position wherein flowers held therein are substantially horizontally aligned, to an intermediate position wherein flowers held therein are at an angle with respect to horizontal, as depicted in FIG. 10. The angle of positioning arm 86' can be chosen to optimize the cutting of flower stems by cutter 90'. Once flower stems are severed by cutter 90', controller 114 then causes positioning arm 86' to rotate to a final position whereby flower bundles held therein are substantially vertically aligned for transport to end station 125.

Figure 11:
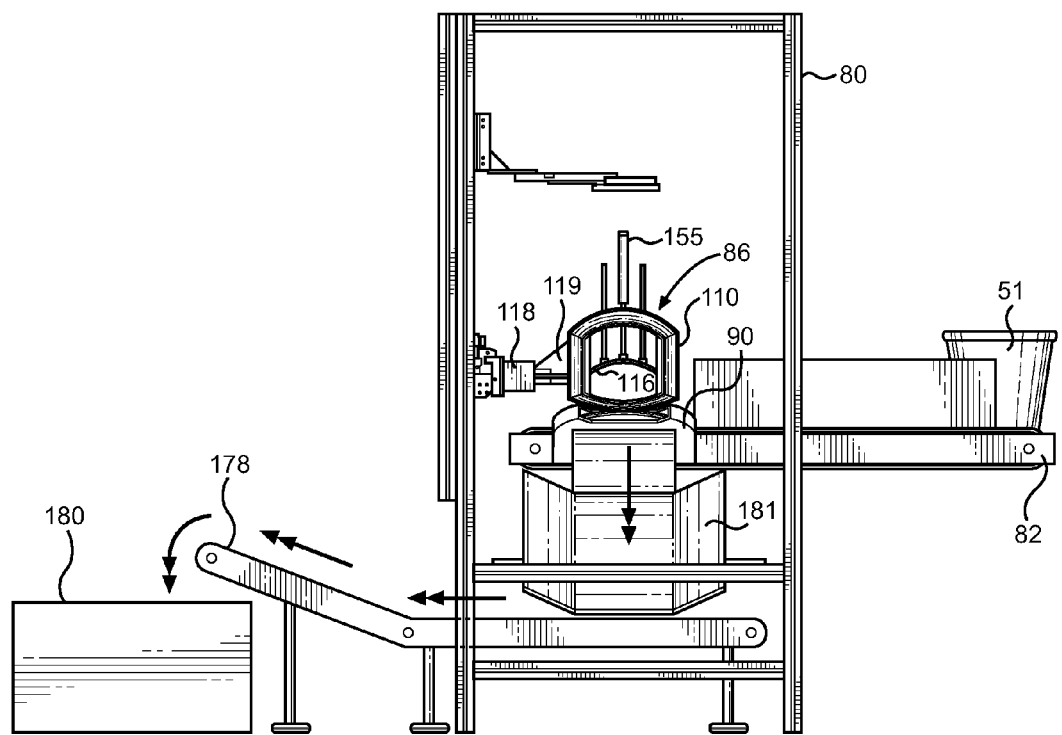
FIG. 11 is a front view of a cutting station of the present invention including a debris carrying conveyor.

In a preferred embodiment shown in FIG. 11, debris collector 124 is in the form of a debris carrying conveyor 178 located beneath cutter 90 and positioned to catch debris falling from the cutter 90, wherein the debris carrying conveyor 178 is configured to carry debris from a position below cutter 90 to a debris bin 180. Angled plexiglass panels indicated at 181 are utilized to direct falling debris onto conveyor 178. It should be appreciated that one of more cooperating debris carrying conveyors 178 can be arranged in any desired configuration to carry chopped stems and other debris from below cutter 90 to a location more easily accessible to workers, thereby improving the ability of workers to dispose of the debris.

Figure 12:
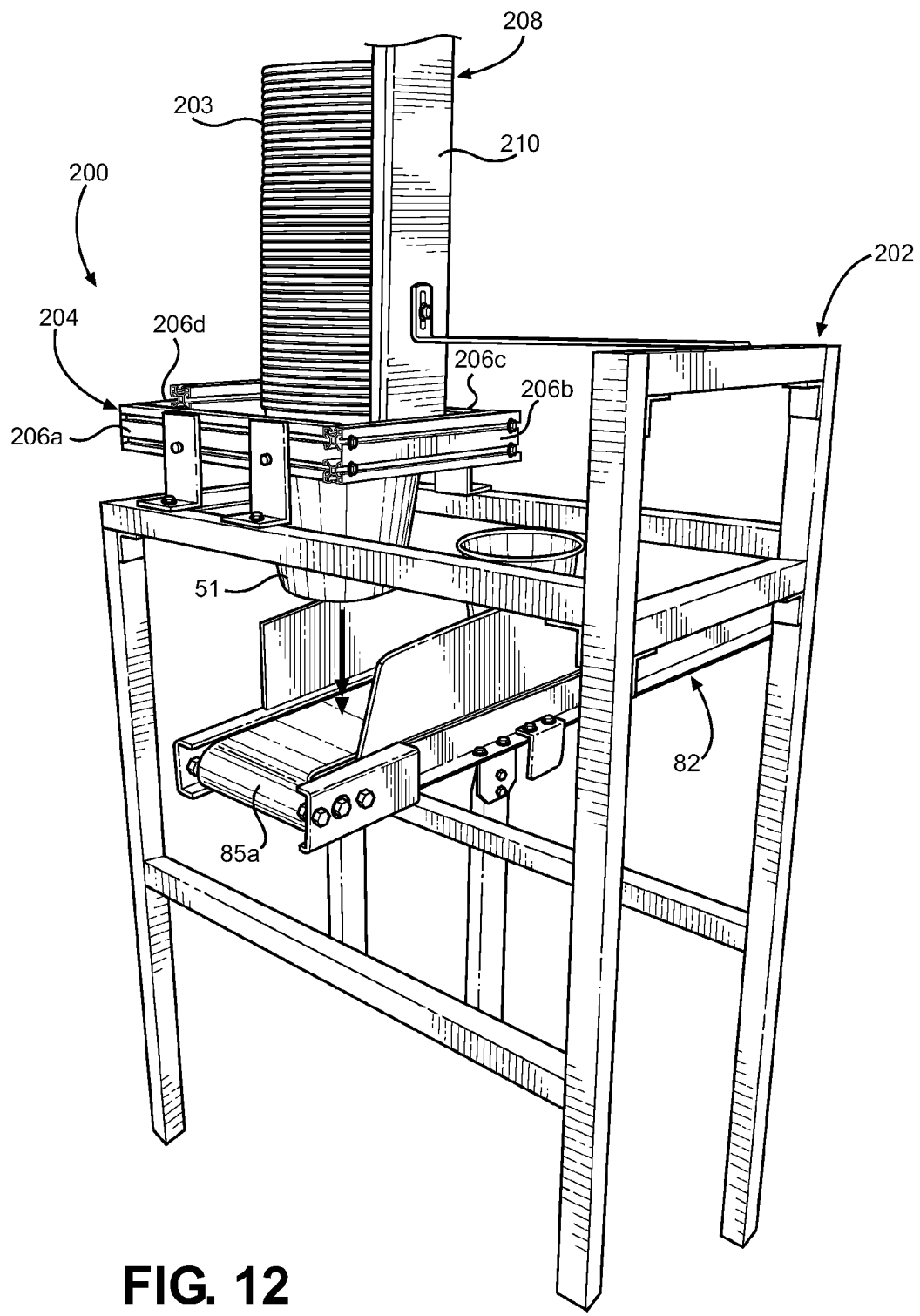
FIG. 12 is a perspective view of a bucket separating device for use with a cutting station of the present invention.

Although buckets 51 may be manually deposited on first bucket conveyor 82, in a preferred embodiment of the invention, a bucket separating device 200 is utilized in conjunction with cutting station 30*a*. See FIG. 12. Bucket separating device 200 includes a frame 202 supporting a stack 203 of buckets 51 above first bucket conveyor 82. More specifically, a support 204, including four connected side walls 206*a*-206*d*, is attached to frame 202 and provides support for stack 203 as well as a housing 208. Housing 208 includes at least first and second opposing side walls, one of which is shown at 210, that prevent stack 203 from undesirable horizontal tipping or shifting. Details of support 204 will now be discussed in more detail with reference to FIG. 13.

A destacking unit 224 extends between opposing first and second side walls 206*a* and 206*b* within support 204, and is connected to a control unit 225 through a side wall 206*c* via a piston 227. Destacking unit 224 includes first and second opposing side arms 228, 229. Each of first and second opposing side arms 228, 229 includes a respective wedge 232*a*, 232*b* and a supporting ledge 252*a*, 252*b* attached thereto. Each wedge 232*a*, 232*b* is substantially triangular shaped, with a wide base 240 tapering down to a tip 242. At a first, starting position, a lip 250 of a bottom bucket 51*e* rests on opposing ledges 252*a*, 252*b* to support bottom bucket 51*e*, and thus the entire stack 203, in a suspended position above conveyor 82. See FIGS. 12 and 13.

Figure 13:
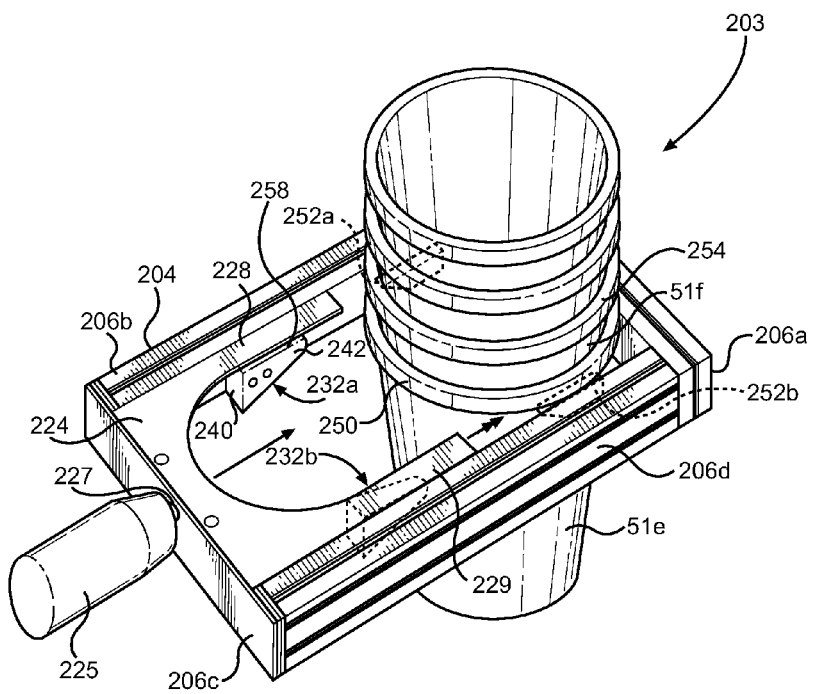
FIG. 13 is a top perspective view of a destacking unit of the present invention.
Figure 14:
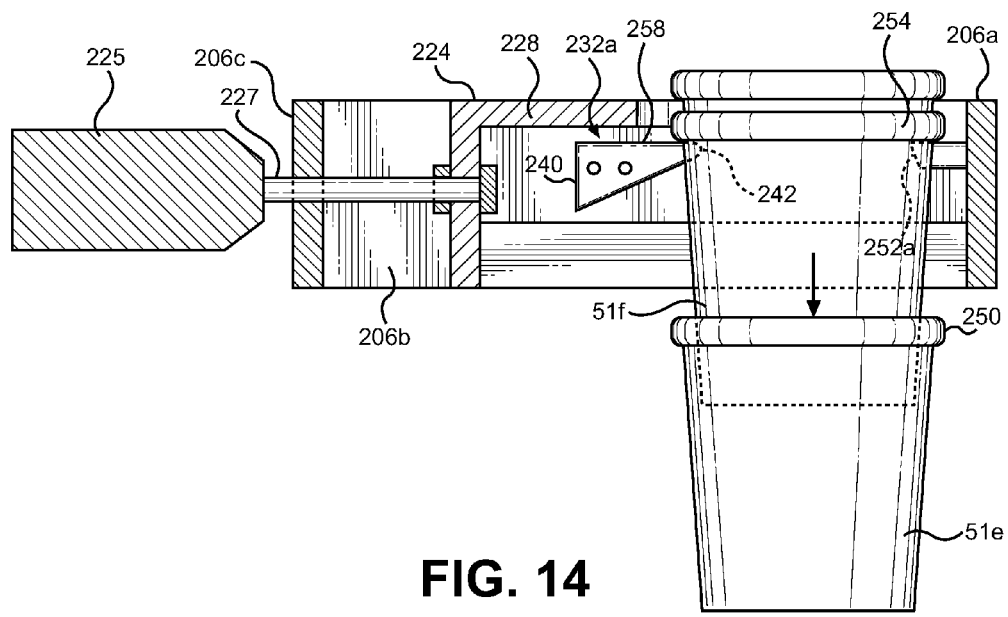
FIG. 14 is a partial cross-sectional side view of the destacking unit of FIG. 13.

In use, control unit 225 is actuated, thereby causing piston 226 to extend and shift destacking unit 224 from a position abutting side wall 206*c* to a position removed from side wall 206*c* in the direction of stack 203. As destacking unit 224 is advanced, bucket 51*e* is held in a substantially stationary position by support 204 such that supporting ledges 252*a*, 252*b* slide with respect to lip 250. Simultaneously, respective tips 242 of wedges 232*a*, 232*b* are driven between lip 250 of bottom bucket 51*e*, and a lip 254 of a bucket 51*f* nested within bottom bucket 51*e*, as depicted in FIG. 13. As the destacking unit 224 is further advanced, supporting ledges 252*a*, 252*b* are pushed beyond lip 250 such that bucket 51*e* is no longer supported by supporting ledges 252*a*, 252*b*, and lip 254 of bucket 51*f* is supported by respective top surfaces 258 of wedges 232*a* and 232*b*. Without the support of supporting ledges 252*a*, 252*b*, bottom bucket 51*e* simply falls by gravity onto first bucket conveyor 82 below. As discussed above, first bucket conveyor 82 is preferably continuously run, such that buckets dropping onto conveyor 82 from bucket separating device 200 will be immediately carried to cutting station 30*a*, where it will advance in turn through the cutting station 30*a* as described above.

Advantageously, the cutting stations 30a-30d of the present invention eliminates the need for floral element stems to be the same length or aligned, since cutter 90 automatically severs flower stems at the same level relative to positioning arm 86. Further, the present invention enables processing of dozens of flower bouquets simultaneously, resulting in flowers spending less time in dry packed boxes. Although described with reference to preferred embodiments of the invention, it should be readily understood that various changes and/or modifications can be made to the invention without departing from the spirit thereof. For instance, although shown as shipping two buckets of flowers per shipping container, any desired shipping container can be utilized to ship any desired number of buckets. Further, various safety features may be implemented, such as a safety stop button (not shown) to immediately turn off cutter 90 and other elements of the apparatus, or safety glass to shield elements of the apparatus. In general, the invention is only intended to be limited by the scope of the following claims.

I claim:

1. A flower handling system comprising:
    at least one cutting station including:
        at least one controller;
        a frame;
        a first bucket conveyor;
        a positioning arm in communication with the at least one controller and having a carrier portion including at least one side wall defining an opening for receiving flower bundles, and a base portion mounting the carrier portion to the frame such that the positioning arm is structured to move with respect to the frame to transport flower bundles between a first location and a second location during a processing cycle, wherein the base portion includes a pivoting connector enabling the carrier portion to rotate from a first position wherein an axis extending through the opening extends in a first direction, to a second position wherein the axis extends at an angle with respect to the first direction; and
        a cutting apparatus located between the first and second locations including a cutting blade positioned below the positioning arm to cut flower stems of flower bundles held by the positioning arm as the positioning arm moves from the first location to the second location.

2. The flower handling system of claim 1, further comprising:
    a clamping arm in communication with the at least one controller and located above an end station on said first bucket conveyor, the clamping arm including first and second clamping portions adapted to move from an open position to a closed position, wherein, when the positioning arm is located at the second location, the clamping arm extends above the positioning arm such that the first and second clamping portions are positioned to close around flower bundles carried by the positioning arm.

3. The flower handling system of claim 2, wherein the frame of the cutting station includes a substantially horizontal track along which the positioning arm is configured to translocate between the first and second locations, and a substantially vertical track adjacent the first bucket conveyor along which the clamping arm is configured to translocate between a lower location and an upper location.

4. The flower handling system of claim 2, wherein the positioning arm further comprises a bar extending therefrom including a bucket engagement portion at an end thereof, wherein the bucket engagement portion is positioned to contact a bucket located at the end station as the positioning arm moves from the first location to the second location.

5. The flower handling system of claim 4, wherein the cutting station further comprises:
    a second bucket conveyor directly adjacent the end station of the first conveyor, wherein, the bucket engagement portion is further positioned to push a bucket located at the end station off of the first bucket conveyor and onto the second bucket conveyor during a processing cycle.

6. The flower handling system of claim 1, wherein the cutting station further comprises:
    a fluid supplying outlet positioned above said first bucket conveyor configured to dispense fluid into a bucket positioned on the bucket conveyor.

7. The flower handling system of claim 1, wherein the cutting blade is in the form of a rotating circular blade.

8. The flower handling system of claim 1, further comprising:
    a loading station including:
        a loading table; and
        a box conveyor adjacent the loading table configured to carry open boxes of flower bundles from the loading table to the at least one cutting station.

9. The flower handling system of claim 1, further comprising:
    a finishing station including a filled bucket conveyor configured to carry buckets of flower bundles away from the at least one cutting station, wherein the filled bucket conveyor includes at least one side accessible to a worker such that steps can be taken by the worker to finish flowers within buckets carried by said filled bucket conveyor.

10. The flower handling system of claim 9, further comprising:
    a boxing station including a box conveyor spaced from and extending substantially parallel to the filled bucket conveyor, such that workers can readily move buckets of flower bundles from the filled bucket conveyor into boxes carried by the box conveyor.

11. The flower handling system of claim 1, further comprising:
    a debris carrying conveyor located beneath the cutting apparatus and positioned to catch debris falling from said cutting apparatus, wherein the debris carrying conveyor is configured to carry debris from a position below the cutting apparatus to a debris bin.

12. The flower handling system of claim 1, wherein the positioning arm further comprises a plate moveable between a first position adjacent the at least one side wall and an extended position within the opening of the carrier portion whereby a contact surface of said plate is positioned to engage flower bundles received within the opening to secure the flower bundles between said plate and an opposing portion of the at least one side wall.

13. The flower handling system of claim 1, further comprising:
    a bucket separating device including:
        a frame;
        a support attached to the frame and including opposing side walls and a back wall;
        a destacking unit, extending between the opposing side walls of the support, including first and second opposing side arms, wherein each of the first and second opposing side arms includes a support ledge extending from an outer surface thereof and a wedge spaced from the support ledge and extending from the outer surface thereof, each support ledge including a top wall and each wedge including a base portion tapering to a tip portion; and a control unit connected to the destacking unit via a piston;

wherein the control unit is configured to move the destacking unit, via the piston, between a first position wherein a rim of a first bucket is supported on the top walls of respective support ledges, and a second position wherein the tip portions of respective wedges extend between the rim of the first bucket and a rim of a second bucket nested within the first bucket, and the rim of the first bucket is no longer supported on the top walls of the respective support ledges.

* * * * *